F. W. GROBY.
MEANS FACILITATING COMBINED ABSTRACTING AND BILLING.
APPLICATION FILED AUG. 15, 1908.

1,178,315.

Patented Apr. 4, 1916.
4 SHEETS—SHEET 1.

| N° Package | Value | From number | To whom addressed | Destination | Weight | Advanced Charges | Billed to Collect | Prepaid | Billed to | N° |
|---|---|---|---|---|---|---|---|---|---|---|
| Pkg. | | 263 | H.W. Harvey + Co., | | 3 | | 45 | | Kingston | 1 |
| Box | | 334 | Gilsey + Co., | | 10 | | 50 | | Albany | 2 |
| Pkg | | 154 | Johnson-Brown | | 20 | | 45 | | Hudson | 3 |
| Pkg | | WF Ex | Albany Hdw. Co., | | 55 | 75 | 85 | | Albany | 4 |
| Pkg | | WF Ex | A.B. Stone + Co., | | 60 | 75 | 150 | | Hudson | 5 |
| Pkg | | 154 | Brown + Co., | | 30 | | 75 | | Cohoes | 6 |
| Box | | WF Ex | Harvey + Co., | | 60 | 35 | 105 | | Glovats | 7 |
| Pkg | | 455 | Gilsey + Co., | | 20 | | 45 | | Hudson | 8 |
| Box | | 5 | A. Smith + Co., | | 25 | | | 35 | Hudson | 9 |
| Box | | WF Ex | F. Dey + Co., | | 60 | | 105 | | Albany | 10 |
| | | | | | | | | | | 11 |
| Box | | 263 | T.A. Triggs, | | 5 | | 35 | | Amsterdam | 12 |
| Pkg | | 132 | Penn Oil Co., | | 10 | | 50 | | Albany | 13 |
| Box | | 132 | Grahame + Co., | | 25 | | 75 | | Amsterdam | 14 |
| Box | | US | Lowell Mfg. Co., | | 60 | 60 | 85 | | Amsterdam | 15 |
| Box | | 155 | Penn Oil Co., | | 55 | | 85 | | Kingston | 16 |
| Bdl. | | 178 | Lock + Dew, | | 70 | | 75 | | Hudson | 17 |
| Pkg | | US | Bell + Co., | | 27 | 35 | 85 | | Fonda | 18 |
| Box | | 154 | Davis + Co., | | 55 | | 75 | | Amsterdam | 19 |
| Box | | 132 | Corey + Co., | | 55 | | 60 | | Cohoes | 20 |
| Pkg | | US | S. Levey + Co., | | 40 | 35 | 120 | | Hudson | 21 |
| | | | | | | | | | | 22 |
| Box | | 134 | F.W. Groby, | | 10 | | 65 | | Elmira | 23 |
| Box | | 233 | H.B. Bouton, Co. | | 15 | | 60 | | Kingston | 24 |
| Bdl. | | 178 | Kingston Mfg. Co., | | 30 | | 55 | | Kingston | 25 |
| Pkg | | 233 | Churchill + Co., | | 35 | | 65 | | Hudson | 26 |
| Pkg | | 178 | Gilhooley + Co., | | 60 | | 75 | | Hudson | 27 |
| Box | | US | G.E. Electric Co., | | 55 | 75 | 150 | | Albany | 28 |
| Pkg | | 178 | Penn Oil Co., | | 80 | | 85 | | Johnstown | 29 |
| Pkg | | 233 | Lytle + Co., | | 55 | | 75 | | Hudson | 30 |
| Pkg | | 198 | Jas. Lange + Co., | | 55 | | | 80 | Fonda | 31 |
| Box | | 132 | Harven + Son, | | 50 | | | 60 | Cohoes | 32 |
| | | | | | | | | | | 33 |
| Pkg | | 435 | Jas. Smith, | | 15 | | 45 | | Amsterdam | 34 |
| Pkg | | 455 | H.W. Keck Mfg. Co., | | 20 | | 75 | | Hudson | 35 |
| Pkg | | 155 | Montgomery + Co., | | 30 | | 35 | | Albany | 36 |
| Box | | 125 | Southworth + Co., | | 60 | | 85 | | Kingston | 37 |
| Box | | 132 | Penn Oil Co., | | 55 | | 85 | | Hudson | 38 |
| Pkg | | 154 | Briggs + Co., | | 50 | | 80 | | Amsterdam | 39 |
| Box | | 233 | Black + Sons, | | 75 | | 75 | | Kingston | 40 |
| Pkg | | WF Ex | Jorden + Co., | | 60 | 35 | 120 | | Albany | |
| Box | | 166 | H. Boone + Co., | | 35 | | | 40 | Kingston | |
| Box | | 155 | Fisher + Co., | | 60 | | | 75 | Liberty | |

Fig. 1.

Witnesses:

Inventor,
Frederick W. Groby
By
L. G. Julihn
Attorney.

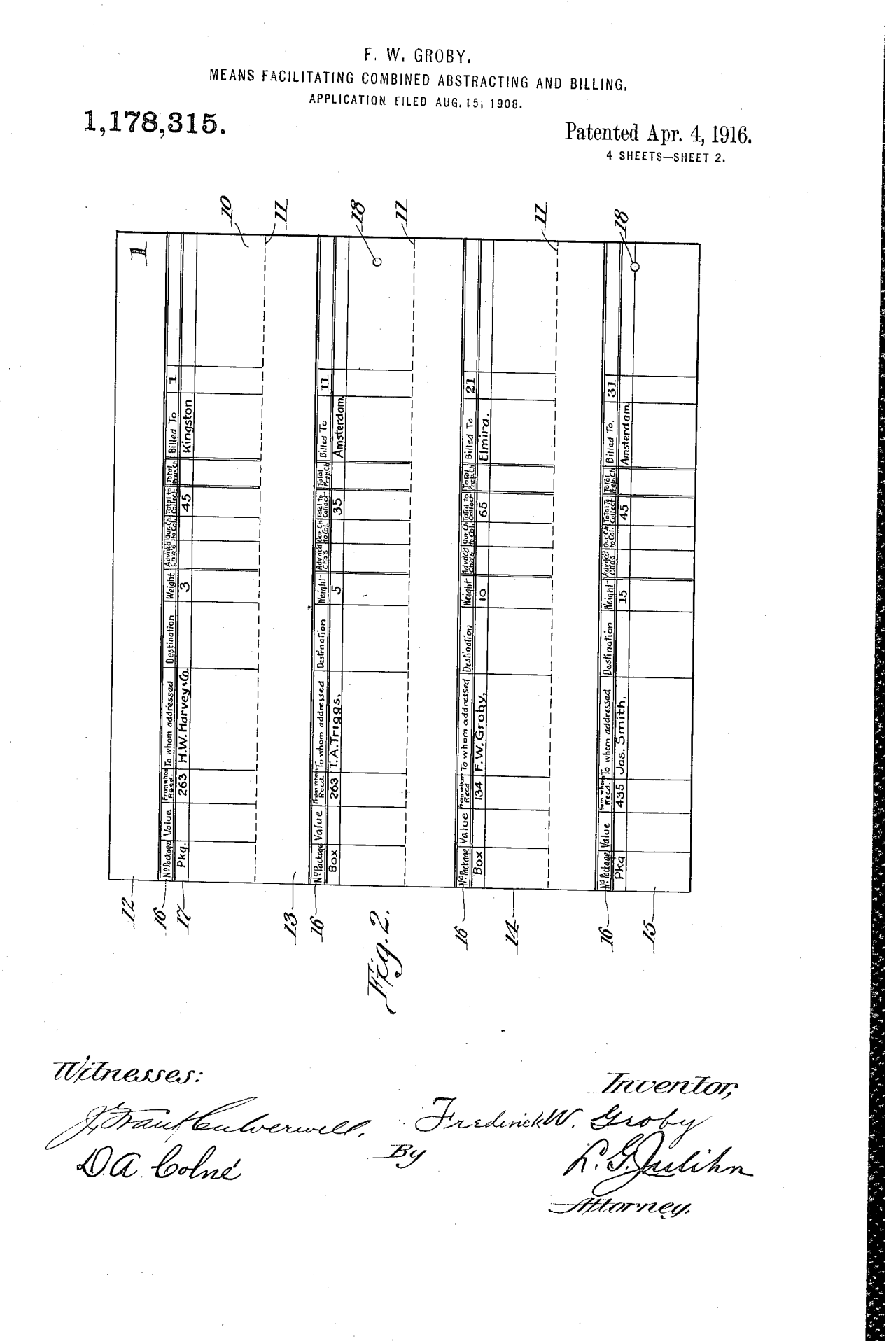

F. W. GROBY.
MEANS FACILITATING COMBINED ABSTRACTING AND BILLING.
APPLICATION FILED AUG. 15, 1908.

1,178,315.

Patented Apr. 4, 1916.

F. W. GROBY.
MEANS FACILITATING COMBINED ABSTRACTING AND BILLING.
APPLICATION FILED AUG. 15, 1908.
1,178,315.
Patented Apr. 4, 1916.
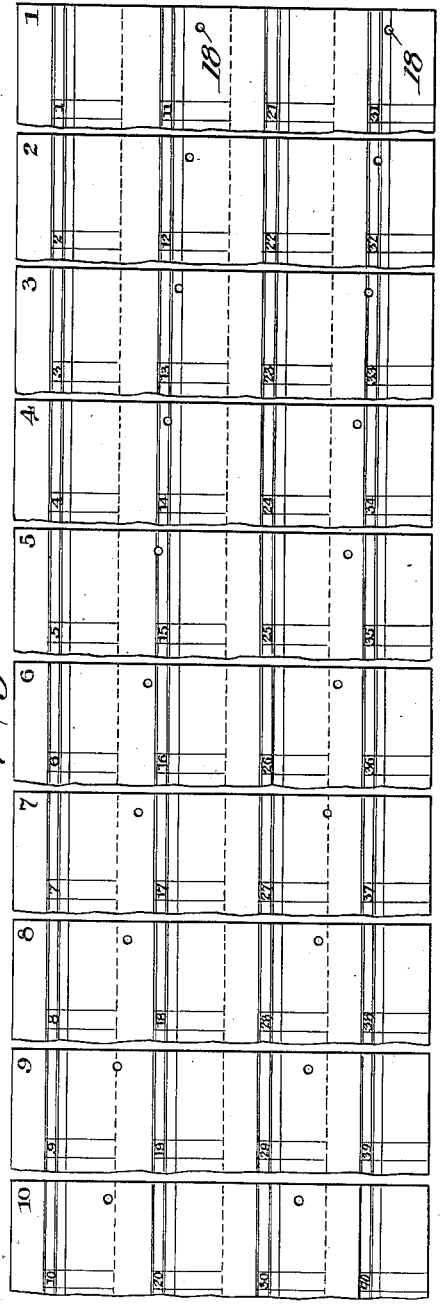
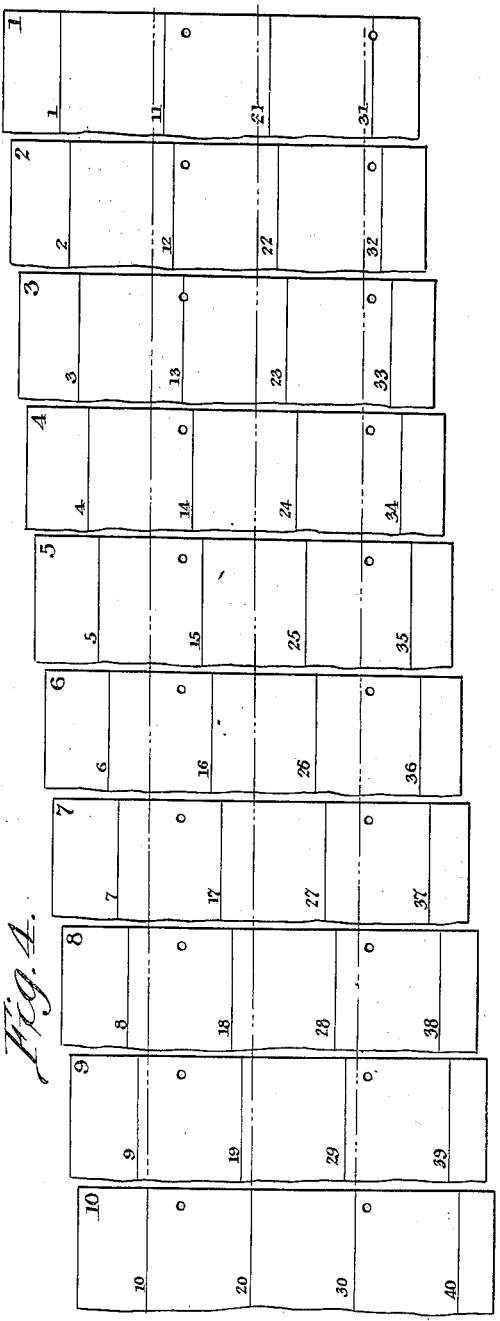

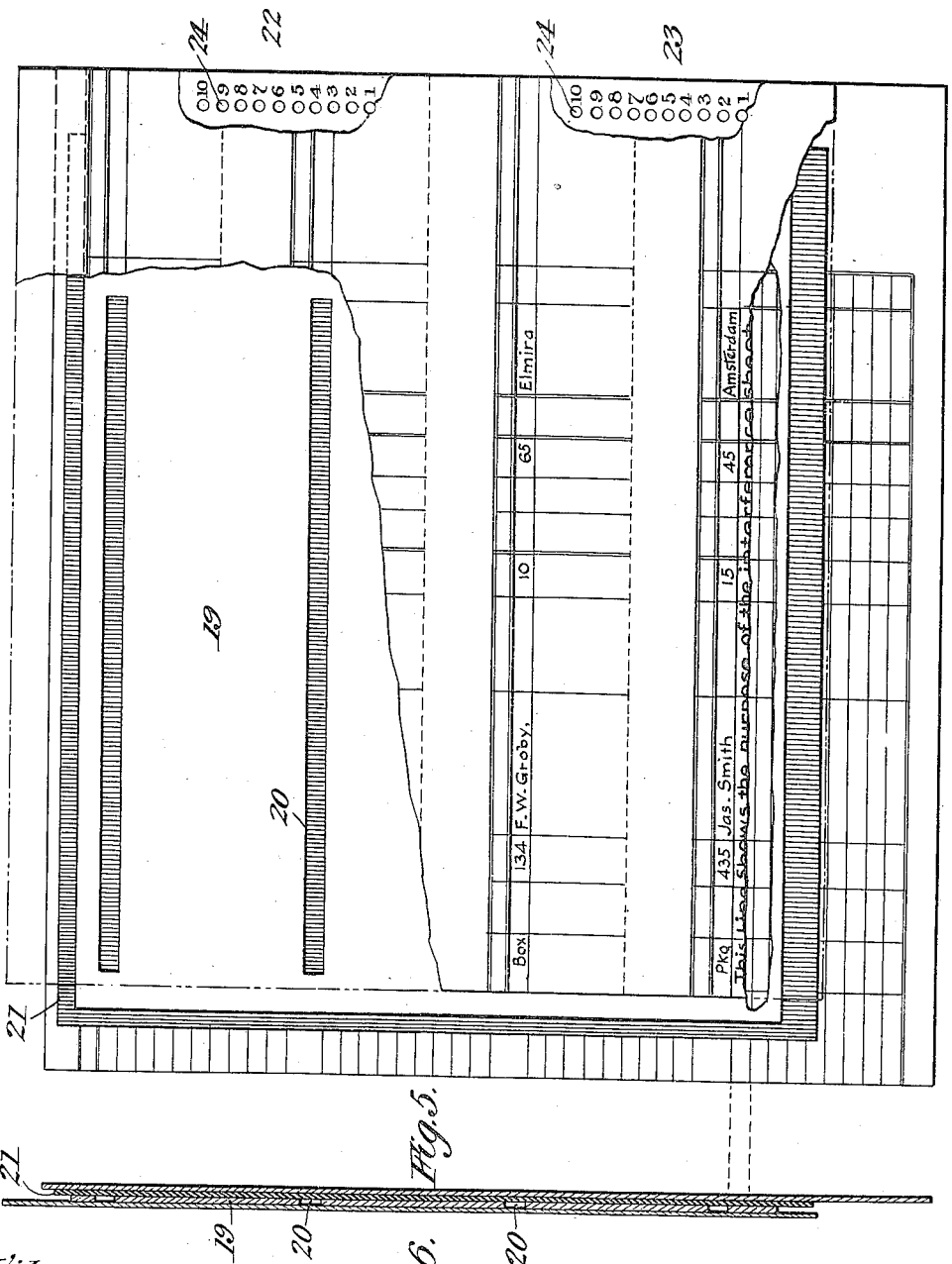

UNITED STATES PATENT OFFICE.

FREDERICK W. GROBY, OF NEW YORK, N. Y., ASSIGNOR TO ELLIOTT-FISHER COMPANY, OF HARRISBURG, PENNSYLVANIA, A CORPORATION OF DELAWARE.

MEANS FACILITATING COMBINED ABSTRACTING AND BILLING.

1,178,315.  Specification of Letters Patent.  Patented Apr. 4, 1916.

Application filed August 15, 1908. Serial No. 448,715.

*To all whom it may concern:*

Be it known that I, FREDERICK W. GROBY, a citizen of the United States of America, residing at New York, in the county of New York and State of New York, have invented certain new and useful Improvements in Means Facilitating Combined Abstracting and Billing, of which the following is a specification.

The invention relates to means whereby billing in general, but more particularly express waybilling and abstracting may be facilitated. It may be stated by way of premise that in express waybilling it is usual to employ bill sheets comprising a number of separably connected individual bills upon each of which a series of entries are made in a single line, these entries denoting for instance the character of the article billed, its value, from whom it is received, to whom it is addressed, its destination, weight, advance charges, charges to be collected, total to be collected, the place to which it is billed, etc. It is also customary by a separate operation to prepare an abstract sheet upon which appear the various entries made on the several bills.

The object of my invention is to devise means whereby the billing and abstracting may be simultaneously accomplished notwithstanding the fact that the entries on the bill sheets are widely separated and those on the abstract sheet closely condensed.

To the accomplishment of this object, I provide an abstract sheet properly subdivided to provide series of condensed entries and having file holes which may be slipped over the studs of a bill holder with which billing machines are commonly equipped. In addition to this abstract sheet I provide a series of bill sheets each including a plurality of bill forms and having file holes designed to aline with those of the abstract sheet, the file holes in the several bill sheets being differently located on said sheets so that when the bill sheets are placed on the studs in succession they will overlie the abstract sheet in progressive positions to the end that as entries are made on successive bill sheets they will be transferred in condensed arrangement to the abstract sheet.

Another object of the invention is to provide a guard sheet having graduated file holes and a series of transverse slots whereby said sheet may be positioned on the studs in correspondence to the position of any one of the bill sheets and arranged, when so positioned, to permit the transference of a single line of entry from a bill to the abstract sheet and prevent the transference of another or other lines of entries which it may be desired to make on the bill sheets without transference to the abstract sheet.

In the accompanying drawings—Figure 1 is a view of an abstract sheet to which the condensed record has been transferred. Fig. 2 is a view of one of the bill sheets showing the manner in which a series of widely separated single line entries are entered. Fig. 3 is a diagrammatic view showing a portion of each of a series of bill sheets arranged in alinement to illustrate the manner in which the file or stud holes are graduated. Fig. 4 is a similar diagrammatic view but showing the file holes on the several sheets arranged in alinement for the purpose of illustrating how the sheets are disposed in progressive positions as they are secured to the same studs which retain the abstract sheet. Fig. 5 is a view showing a portion of a bill broken away to disclose the underlying guard sheet imposed upon a carbon sheet which is in turn imposed upon the abstract sheet, this view being designed more particularly to illustrate the guard sheet and to make clear its manner of use, and Fig. 6 is a sectional view through the subject-matter of Fig. 5.

Each feature of construction and arrangement is designated by the same reference character wherever shown.

1 indicates the abstract sheet which is suitably ruled to receive a condensed record of express business transacted at a given office or for a given period. This ruling preferably consists of groups 2, 3, 4 and 5 of transverse lines 6, preferably arranged ten in a group so that each group is adapted to receive ten single line entries, the entry lines or spaces being successively numbered adjacent to the right hand edge of the sheet, as indicated at 7.

The members 7 indicate the respective lines of entry and correspond to the numbers of the bills to be described. In addition to the transverse ruling the abstract sheet 1 is subdivided by vertical lines into vertical columns which are suitably designated by a line of designations 8 extending along the upper edge of the sheet 1. The particular significance of these designations will vary in accordance with the particular work in hand, but, in the example given these designations relate to express business and indicate the character of the package, its value, "From whom received", "To whom addressed", "Destination", "Weight", "Advance charges", "Our charges", "Total to collect", "Prepaid" and "Billed to".

At one edge of the sheet 1, preferably the right hand edge, as shown, the sheet is provided with spaced file holes or stud holes 9, utilized for the binding of abstract sheets after the preparation thereof and employed during the billing and abstracting operation as retaining means for the sheet, that is to say, these holes 9 receive a pair of studs which project from a suitable support, as for instance the bill holder of a well known billing machine. Each bill sheet 10 is subdivided by transverse weakening lines 11 into a series of bills 12, 13, 14 and 15, each of which has in practice a single line of designations 16 and a line of entry 17, the lines of entry on the several bills of a sheet corresponding in relative position to corresponding lines of entry in the several groups 2, 3, 4 and 5 on the charge sheet 1. For instance, in Fig. 2 of the drawings is illustrated the first bill sheet. This sheet when placed over the abstract sheet 1 will present the several entry lines 17 on the bills 12, 13, 14 and 15 opposite the uppermost entry line of each group on the sheet 1, so that as the four entries on the first bill sheet are made out, these entries will be transferred to the first or uppermost entry line of each of the groups 2, 3, 4 and 5. The bill sheets 10 are provided with file holes 18 designed to aline with the holes 9 in the abstract sheet. It will therefore appear that each successive bill sheet may be dropped down one line on the abstract sheet by properly locating the file holes 18 in graduated arrangement throughout a series of bill sheets. Thus in Fig. 3 a series of ten bill sheets are indicated and it will be seen that the file holes 18 therein occupy graduated positions. Therefore, when the file holes of successive bill sheets are brought in alinement with the file holes of the charge sheet it will be seen that each successive bill sheet is dropped down one line so that the lines of entry thereon will be transferred to the abstract sheet just below the lines of entry previously transferred to the abstract sheet from the preceding bill sheet, the result being that while the widely spaced entries are being made on the successive bill sheets, the same entries will be transferred to the charge sheet in condensed form.

It sometimes happens that it is desirable to write other data on the individual bills. That is to say, in addition to the line of entry of which an abstract is desired, it may be desirable to write in other data which should not be transferred to the abstract sheet. To make such additional entries possible without transference I provide an interference or guard sheet 19 provided with transverse slots 20 spaced apart by intervals corresponding to the spacing of the lines of entry on the several bills of a bill sheet. This guard sheet is imposed upon the carbon or transfer sheet 21 utilized in the usual way to transfer the entries from the bill sheets to the abstract sheet. It will thus be seen that when the usual entries are made on the bill sheet they will coincide with the slots 20 in the guard sheet 19 and will therefore be transferred to the abstract sheet in an obvious manner. If, however, other entries are made on the bill sheet, they will not be coincident with the slots 20, but will be opposite the solid portion of the guard sheet. Therefore no transference of these entries will be effected because the guard sheet is of non-transferring material, as for instance comparatively stiff paper board. It will be noted, however, that as successive bill sheets occupy successive positions relative to the abstract sheet, it is necessary that the guard sheet be capable of occupying successive positions in order that the slots therein may aline with the lines of entry of any bill sheet.

To provide for this variable positioning of the guard sheet, the latter is provided with two series 22 and 23 of file or stud holes 24, the bill sheets being preferably numbered successively and corresponding numbers being placed opposite the holes in the guard sheet. Corresponding holes 24 of the respective series are separated by the same interval which separates the holes 9 in the abstract sheet or the holes 18 in a bill sheet, and the separation of the respective holes of each series 22 and 23 corresponds to the graduation of the holes in the respective bill sheets. Therefore, the guard sheet 19 is equipped with a pair of holes appropriated to and corresponding with the holes in the respective bill sheets so that the guard sheet may be used in connection with any bill sheet by merely placing the proper holes over the studs.

It will be seen from the foregoing that I have devised a simple, inexpensive and convenient arrangement whereby express way-billing and condensed abstracting or analogous processes may be accomplished simultaneously and with only that expenditure of time and labor which is required for billing or abstracting alone. It will also be noted that while the described means is particularly adapted for abstracting and billing in connection with a flat platen billing machine, its utility is in no way dependent upon the particular instrumentality employed for the making of the record, as it is immaterial whether the entries are made by a typewriter, pen, pencil, stylus, or other record making medium.

It is thought that from the foregoing, the construction, arrangement and advantages of my invention will be clearly apparent, but I wish to reserve the right to effect such changes or variations of the illustrated construction and arrangement as may come fairly within the scope of the protection prayed.

What I claim is:—

1. The combination with a sheet having retaining means, of a series of bill sheets each having retaining means to register with the retaining means of the first named sheet, the location of the retaining means of each bill sheet with respect to the area of said sheet being different, whereby the registration of the retaining means of different bill sheets with the retaining means of the first named sheet will result in a different relative location of each bill sheet with respect to the sheet first named.

2. The combination with a sheet having spaced stud holes, of a series of bill sheets each having stud holes corresponding in spacing to those of the first named sheet, the holes of successive bill sheets occupying progressively different positions whereby when the holes of successive bill sheets are brought into coincidence with the holes of the sheet first named said bill sheets will occupy progressively different positions with respect to said first named sheet and transfer means whereby data written on the bill sheet will be transferred to the first sheet named.

3. The combination with a sheet having rulings defining condensed record spaces thereon, and stud holes, of a series of bill sheets having stud holes, the holes in the respective bill sheets being differently located to cause said bill sheets to assume successive positions with respect to the first named sheet when the holes in said sheet and those in the bill sheets are brought into coincidence, and said bill sheets having weakening lines dividing said sheets into individual bills and transfer means whereby data written on a bill sheet will be transferred to the sheet first named.

4. The combination with a base or abstract sheet having stud holes, of a series of bill sheets each having stud holes to register with the holes of the base sheet, the holes in the bill sheets being progressively located in relation to an edge of said bill sheets, a guard sheet having an opening to overlie the abstract sheet and adapted to restrict transfer of data written on the bill sheets to the abstract sheet, said guard sheet being provided with stud holes to register with the holes of the base sheet and so located that an opening of the guard sheet may be alined with a restricted area of the abstract sheet, and transfer means whereby data written on a bill sheet will be transferred to the base or abstract sheet.

5. The combination with a sheet having groups of rulings and stud holes, of a series of bill sheets each having weakening lines dividing the bill sheet into bills corresponding in spacing to the groups of rulings on the sheet first named, each bill sheet having stud holes corresponding in spacing to the holes of the first named sheet and the holes of successive bill sheets occupying progressively different positions, whereby when the holes of successive bill sheets are brought into coincidence with the holes of the sheet first named said bill sheets will occupy progressively different positions with respect to the first named sheet, and transfer means whereby data printed on a bill sheet will be transferred to the first named sheet.

6. In combination, a base sheet and a series of bill sheets, all of said sheets being adapted to receive lines of writing and having stud holes in the same margin, said bill sheet being adapted for successive use in connection with the base sheet and each having its stud holes arranged to coincide with the file holes of the base sheet, the stud holes in the respective bill sheets having a different location in said sheets to cause the respective bill sheets to occupy different positions with respect to the base sheet when the stud holes of the bill sheets are in coincidence with the stud holes of the base sheet, and transfer means whereby data written on a bill sheet will be transferred to the base or abstract sheet.

7. The combination with a base or abstract sheet having defined recording spaces arranged in groups, of a series of bill sheets, said abstract and bill sheets being designed to receive lines of writing and having correspondingly spaced holes, the stud holes of each bill sheet being successively positioned to vary the relation of the bill sheet with the abstract sheet, such variation causing the first line of each bill sheet to overlie an advanced position in the writing area of the abstract sheet, and transfer means whereby data written on the bill sheet will be transferred to the base or abstract sheet.

8. In combination, a base sheet, a guard sheet and a series of bill sheets adapted to receive lines of writing and all of said sheets having stud holes in the same margin, said bill sheet being adapted for successive use in connection with the base sheet and each having its holes arranged to coincide with the file holes of the base sheet, the holes in the respective bill sheets having a different location with respect to the first writing line of said bill sheets to cause the first writing lines of the respective bill sheets to occupy different positions with respect to the base sheet when the holes of the bill sheets are in coincidence with the holes of the base sheet, and said guard sheet having a transverse opening to leave a restricted area of the base sheet unguarded and having stud holes so located that a given transverse opening of the guard sheet may be alined with a restricted number of writing lines on the abstract sheet, and transfer means whereby data written on the bill sheet will be transferred to the base or abstract sheet.

9. The combination with a plurality of sheets each having openings for the reception of studs, the openings in the respective sheets being uniformly and correspondingly spaced but located differently in each sheet, whereby each sheet will be differently located with respect to the same studs engaged thereby.

In testimony whereof I affix my signature in presence of two witnesses.

FREDERICK W. GROBY.

Witnesses:
W. L. DEECH,
M. H. BEHR.